United States Patent
Meier

(10) Patent No.: US 11,604,865 B2
(45) Date of Patent: Mar. 14, 2023

(54) METHOD FOR THE SECURED ACCESS OF DATA OF A TRANSPORTATION VEHICLE

(71) Applicant: VOLKSWAGEN AKTIENGESELLSCHAFT, Wolfsburg (DE)

(72) Inventor: Andreas Meier, Schoeningen (DE)

(73) Assignee: Volkswagen Aktiengesellschaft

( * ) Notice: Subject to any disclaimer, the term of this patent is extended or adjusted under 35 U.S.C. 154(b) by 507 days.

(21) Appl. No.: 16/337,946

(22) PCT Filed: Sep. 14, 2017

(86) PCT No.: PCT/EP2017/073209
§ 371 (c)(1),
(2) Date: Mar. 29, 2019

(87) PCT Pub. No.: WO2018/059964
PCT Pub. Date: Apr. 5, 2018

(65) Prior Publication Data
US 2020/0026864 A1    Jan. 23, 2020

(30) Foreign Application Priority Data
Sep. 30, 2016   (DE) .................... 10 2016 219 014.8

(51) Int. Cl.
*G06F 21/44*     (2013.01)
*H04W 4/48*      (2018.01)
(Continued)

(52) U.S. Cl.
CPC .............. *G06F 21/44* (2013.01); *G06F 21/62* (2013.01); *G07C 5/008* (2013.01);
(Continued)

(58) Field of Classification Search
CPC .......... G06F 21/44; G06F 21/62; H04W 4/48; H04W 12/069; H04W 12/082;
(Continued)

(56) References Cited

U.S. PATENT DOCUMENTS 9,632,920 B2 * 4/2017 Green .................... G06Q 20/14
9,767,626 B2 * 9/2017 Makke ................. B60Q 1/0076
(Continued)

FOREIGN PATENT DOCUMENTS

| | | |
|---|---|---|
| DE | 102011100938 A1 | 11/2012 |
| DE | 102012109620 A1 | 4/2013 |
| DE | 102012012565 A1 | 12/2013 |
| DE | 102012221462 A1 | 5/2014 |
| DE | 102014218225 A1 | 3/2016 |
| DE | 102015119282 A1 | 5/2016 |

OTHER PUBLICATIONS

Search Report for International Patent Application No. PCT/EP2017/073209; dated Oct. 20, 2017.

*Primary Examiner* — Linglan Edwards
(74) *Attorney, Agent, or Firm* — Barnes & Thornburg, LLP

(57) ABSTRACT

A method for the secured access of data of a transportation vehicle including providing a mobile terminal on which an application is installed that uses data of the transportation vehicle and providing a separate storage unit on which data of the transportation vehicle is stored by a controller of the transportation vehicle for retrieval by the mobile terminal. The method authenticates the use on an authentication module using an identification feature and provides a reading access to the separate storage unit for use on the mobile terminal after a successful authentication.

12 Claims, 1 Drawing Sheet

(51) Int. Cl.
*G06F 21/62* (2013.01)
*G07C 5/00* (2006.01)
*H04L 9/40* (2022.01)
*H04L 67/12* (2022.01)
*H04W 12/069* (2021.01)
*H04W 12/082* (2021.01)

(52) U.S. Cl.
CPC .......... *H04L 63/0823* (2013.01); *H04L 67/12* (2013.01); *H04W 4/48* (2018.02); *H04W 12/069* (2021.01); *H04W 12/082* (2021.01)

(58) Field of Classification Search
CPC ............. H04L 63/0823; H04L 63/0884; H04L 63/0892; H04L 67/12; G07C 5/008
See application file for complete search history.

(56) References Cited

U.S. PATENT DOCUMENTS

| | | | |
|---|---|---|---|
| 10,489,132 B1* | 11/2019 | Bloomcamp | G06F 8/65 |
| 2007/0156311 A1* | 7/2007 | Elcock | G07C 5/008 |
| | | | 701/31.4 |
| 2012/0324482 A1 | 12/2012 | Park | |
| 2014/0018129 A1 | 1/2014 | Baldini et al. | |
| 2014/0121891 A1* | 5/2014 | Barrett | G07C 5/008 |
| | | | 701/33.2 |
| 2016/0071333 A1 | 3/2016 | Haidar et al. | |
| 2016/0152210 A1* | 6/2016 | Fulop | B60R 25/31 |
| | | | 701/36 |
| 2017/0195324 A1* | 7/2017 | Yamamoto | H04L 67/12 |

* cited by examiner

METHOD FOR THE SECURED ACCESS OF DATA OF A TRANSPORTATION VEHICLE

PRIORITY CLAIM

This patent application is a U.S. National Phase of International Patent Application No. PCT/EP2017/073209, filed 14 Sep. 2017, which claims priority to German Patent Application No. 10 2016 219 014.8, filed 30 Sep. 2016, the disclosures of which are incorporated herein by reference in their entireties.

SUMMARY

Illustrative embodiments relate to a method for securely accessing data of a transportation vehicle and to a system for securely accessing data of a transportation vehicle.

BRIEF DESCRIPTION OF THE DRAWINGS

Disclosed embodiments are explained below with reference to the associated drawings. In the figures.

DETAILED DESCRIPTION

Figure 1:
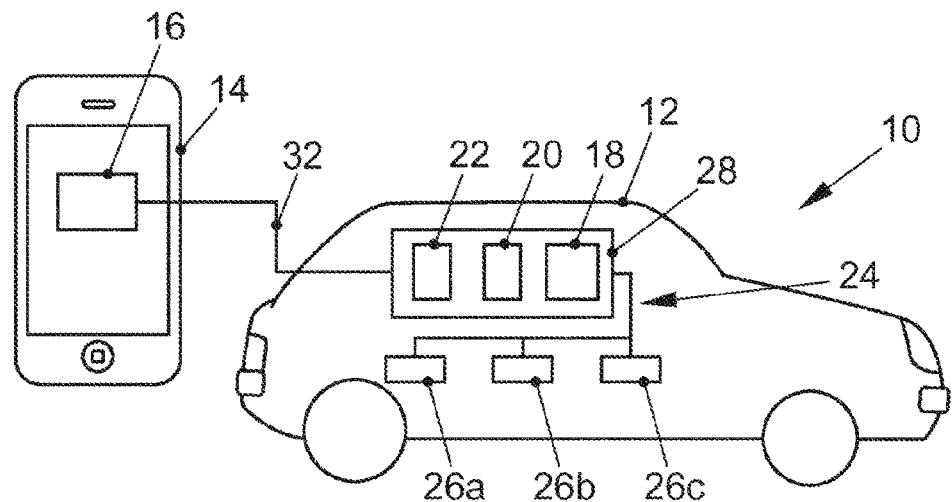
FIG. 1 shows a schematic illustration of an exemplary embodiment of the disclosed system for securely accessing data of a transportation vehicle.

Unlike conventional applications for mobile terminals, such as smartphones or tablets, transportation vehicle-based mobile online services have available to them transportation vehicle-specific data, which are recorded, for example, by sensors of the transportation vehicle in question. Using such data, it is possible to create attractive programs for transportation vehicle owners and transportation vehicle users, whose availability and/or compatibility with particular transportation vehicles will also influence the purchase decision of potential buyers in the future.

The development of mobile online services, in comparison with the development of conventional applications for mobile terminals, is however comparatively cost-intensive and time-intensive. The drawback of the known applications is that they do not have any access to transportation vehicle-specific data. There is a need to allow external developers as well to develop mobile online services that have access to transportation vehicle-specific data, to be able to provide the transportation vehicle owners and transportation vehicle users with corresponding programs in attractive conditions.

There is however always the danger of data misuse being facilitated by releasing the transportation vehicle-specific data. For this reason, a situation whereby corresponding applications gain unrestricted access to the data from transportation vehicles, which is not able to be monitored by the manufacturer or another entity, has to be avoided.

Document DE 10 2011 100 938 A1 discloses a vehicle information and entertainment system for executing applications. The system comprises an operating system that is designed to execute applications, a monitoring unit that is designed to determine current state variables of the vehicle and an authorization unit that is designed to prevent or to allow the execution of applications by the operating system depending on the determined current state variables of the vehicle.

Document DE 10 2014 218 225 A1 furthermore discloses a method for constructing a secure, authenticated connection between an object and a central computer unit, wherein the connection is constructed by a mobile computer unit, wherein authentication of a user at the central computer unit is ensured by a client certificate that has been loaded in an app on the mobile computer unit.

Document US 2012/0324482 A1 furthermore discloses a method that allows applications on a mobile terminal to be provided on a vehicle entertainment apparatus in a secure manner. To this end, a permission check is performed, by way of which the approval of a user for particular data is checked.

However, these and other known solutions do not provide any possibility as to how a release of transportation vehicle-specific data for applications on mobile terminals may be performed without a loss of control with regard to the released data.

Now, the disclosed embodiments create a possibility of providing transportation vehicle-specific data in a controlled manner for use with applications on mobile terminals.

Disclosed embodiments provide a method and a system.

In the disclosed method for securely accessing data of a transportation vehicle, a mobile terminal is provided on which there is installed an application that is designed to use data of the transportation vehicle. Furthermore, a dedicated memory is provided in which, by way of a controller of the transportation vehicle, data of the transportation vehicle are provided for retrieval by the mobile terminal. According to the disclosed embodiments, the application authenticates itself on an authentication module, designed for this purpose, by way of an identification feature, and the application on the mobile terminal, following successful authentication, is provided with read access to the dedicated memory therefor.

The disclosed method has the benefit that there is no direct access to a transportation vehicle-internal communication system, such as a transportation vehicle-internal Ethernet or a transportation vehicle bus, for instance, a Controller Area Network (CAN) bus, a Media Oriented System Transport (MOST) bus or a FlexRay bus. By using a dedicated memory, the communication interface of the transportation vehicle, which interface communicates with the mobile terminal, is decoupled from the transportation vehicle-internal communication systems. It is thus possible only to release the data for use by the application on the mobile terminal that are located in the dedicated memory. In addition, an authentication module is provided that checks the authorization of the mobile terminal and/or of the application on the mobile terminal before providing the data. The identification feature that is used may be valid only for a selected combination of application, mobile terminal and transportation vehicle. This thus prevents a manipulated application from being able to use the identification feature of another application and being able to access data of another transportation vehicle by copying the identification feature onto another mobile terminal and/or by manipulating the application. Optionally, authentication of the application on the authentication module, designed for this purpose, by way of the identification feature likewise comprises authorizing the application to access selected data in the dedicated memory. The application is granted only read access to the dedicated memory. Read access may be granted for all data or only for some of the data that are stored in the dedicated memory. Read access is granted only for data for which the application has been authorized beforehand. As an alternative, in addition to read access to the dedicated memory, the application may also be granted write access to the dedicated memory.

The controller may be connected to one or more transportation vehicle-internal communication systems and be designed to retrieve data of the transportation vehicle to be stored in the dedicated memory via the one or more transportation vehicle-internal communication systems. In this way, transportation vehicle-specific data that are already used, for example, by another transportation vehicle-specific device may be retrieved by the controller and stored in the dedicated memory. These may be, for example, sensor data on the position, speed and/or acceleration of the transportation vehicle. Furthermore, the data may relate to the energy or fuel consumption of the transportation vehicle or the state of individual transportation vehicle systems. Furthermore, the data may also relate to sensor data logs and/or profiles. As an alternative or in addition, the data may relate to image and/or audio signals that are recorded by transportation vehicle-internal cameras, radar sensors, laser scanners, ultrasound sensors and/or other imaging sensors or microphones.

The controller may prevent the application on the mobile terminal from accessing the one or more transportation vehicle-internal communication systems. Due to the fact that the controller is able to prevent the application on the mobile terminal from accessing the one or more transportation vehicle-internal communication systems, the risk of losing control over the data of the transportation vehicle is further reduced. The controller may fully or partly prevent the application on the mobile terminal from accessing the one or more transportation vehicle-internal communication systems. Some data that are communicated within the transportation vehicle, such as, for example, the time, the date or other publicly accessible and/or non-transportation vehicle-specific data, are not particularly worth protecting, such that, in some situations, partial access prevention may make sense.

The authentication module may be configured as a component of a transportation vehicle-specific media playback system or of a transportation vehicle-specific communication unit having Internet connectivity. The authentication may thus already take place in the transportation vehicle, such that no separate connection to an authentication entity is necessary. If the transportation vehicle-specific media playback system or the transportation vehicle-specific communication unit is designed to communicate directly with the mobile terminal, for example, via BLUETOOTH®, the authentication may also take place when an Internet connection is not available. As an alternative, the authentication module may be configured as a component of a central computer that is designed to communicate with the mobile terminal and the transportation vehicle. The central computer is, for example, a back-end of a transportation vehicle manufacturer or of a third-party provider. Due to the fact that the authentication module is configured as a component of a central computer, central authentication may be performed. In the case of a certificate-based authentication, this may be beneficial when the central computer is designed to check the authenticity and validity of a certificate that is used.

The authentication of the application on the authentication module, designed for this purpose, by way of an identification feature may comprise transmission of the identification feature from the mobile terminal to the transportation vehicle-specific media playback system or the transportation vehicle-specific communication unit and/or transmission of the identification feature from the transportation vehicle-specific media playback system or the transportation vehicle-specific communication unit to the central computer. The central computer may be designed to generate an authorization file, which comprises, for example, a token or a certificate, and to send this to the transportation vehicle-specific media playback system or the transportation vehicle-specific communication unit. The transportation vehicle-specific media playback system or the transportation vehicle-specific communication unit then forwards the authorization file to the application on the mobile terminal. The authorization file may have a restricted validity and comprise information about the scope of the data to be released for the application. The central computer may furthermore inform the transportation vehicle-specific media playback system or the transportation vehicle-specific communication unit about which data should be released to the application on the mobile terminal. The transportation vehicle-specific media playback system or the transportation vehicle-specific communication unit, on the basis of this information, may then prompt the controller to retrieve the corresponding data via one or more transportation vehicle-internal communication systems, for instance, via a transportation vehicle bus, and store them in the dedicated memory. The mobile terminal may then access the corresponding data in the dedicated memory by way of the authorization file. If an application is subsequently identified as being defective, the authorization file or the certificate or the token within the authorization file may be declared invalid, such that the central computer blocks the data release. The application on the mobile terminal may have been investigated and checked beforehand by the manufacturer or a third-party provider so as to define the scope of the data of the transportation vehicle to be released for the application.

The identification feature may comprise a token and/or a certificate. As an alternative or in addition, PINs, hashes and other security functions may also be used. The certificate and/or the token have to be created before the first use and stored on the mobile terminal. If the mobile terminal is then connected to the transportation vehicle-specific media playback system or the transportation vehicle-specific communication unit in terms of signaling, the application may authenticate itself directly on the transportation vehicle-specific media playback system or the transportation vehicle-specific communication unit. The connection in terms of signaling between the transportation vehicle-specific media playback system or the transportation vehicle-specific communication unit and the mobile terminal may be wired or wireless. For authentication purposes, the certificate or the token is transmitted to the transportation vehicle-specific media playback system or the transportation vehicle-specific communication unit. The certificate or the token may then be transmitted in encrypted form to the central computer by the transportation vehicle-specific media playback system or the transportation vehicle-specific communication unit. The central computer checks the certificate or the token for validity. The validity check may comprise establishing whether the application mentioned in the certificate or the token from the mobile terminal mentioned in the certificate or the token accesses the transportation vehicle mentioned in the certificate or the token. If this is confirmed, the central computer informs the transportation vehicle-specific media playback system or the transportation vehicle-specific communication unit about which data of the transportation vehicle the application is allowed to access. As soon as the transportation vehicle-specific media playback system or the transportation vehicle-specific communication unit has received confirmation of authenticity and has been informed which data should be provided, it may issue the application with an authorization file, which may likewise comprise a certificate or a token. A storage process also begins, which retrieves the required data from the one or more transportation vehicle-internal communication systems and stores them in the dedicated memory.

The dedicated memory may be configured as a component of a transportation vehicle-specific media playback system or of a transportation vehicle-specific communication unit having Internet connectivity. As an alternative, the dedicated memory may be configured as a component of a central computer that is designed to communicate with the mobile terminal and the transportation vehicle. If the dedicated memory is configured as a component of the transportation vehicle-specific media playback system or the transportation vehicle-specific communication unit, a direct data exchange may take place between the transportation vehicle-specific media playback system or the transportation vehicle-specific communication unit and the mobile terminal. If the dedicated memory is configured as a component of a central computer, data security is further increased since the data of the transportation vehicle are retrieved by the mobile terminal not directly from the transportation vehicle, but rather from a transportation vehicle-external memory. The risk of the application gaining access to further data of the transportation vehicle is thus considerably reduced.

The method may comprise transmission of data of the transportation vehicle from the one or more transportation vehicle-internal communication systems to the transportation vehicle-specific media playback system or the transportation vehicle-specific communication unit and/or transmission of data of the transportation vehicle from the transportation vehicle-specific media playback system or the transportation vehicle-specific communication unit to the mobile terminal. As an alternative or in addition, the method may comprise transmission of data of the transportation vehicle from the transportation vehicle-specific media playback system or the transportation vehicle-specific communication unit to the central computer and/or transmission of data of the transportation vehicle from the central computer to the mobile terminal. Depending on the device in which the dedicated memory, to which the mobile device has access, is integrated, various combinations of the designated data transmission paths may result. Transmission of the data of the transportation vehicle from the transportation vehicle-specific media playback system or the transportation vehicle-specific communication unit directly to the mobile terminal simplifies the access method. Transmission of the data of the transportation vehicle from the transportation vehicle-specific media playback system or the transportation vehicle-specific communication unit via the central computer to the mobile terminal leads to even more control over the released data.

The application on the mobile terminal may retrieve the data of the transportation vehicle via an application programming interface. The retrieval of the data of the transportation vehicle from the dedicated memory by the application on the mobile terminal and/or the retrieval of the data of the transportation vehicle from the one or more transportation vehicle-internal communication systems by the controller may be performed regularly or irregularly. Furthermore, the retrieval of the data of the transportation vehicle from the dedicated memory by the application on the mobile terminal and/or the retrieval of the data of the transportation vehicle from the one or more transportation vehicle-internal communication systems by the controller may be initiated by an event. The event may relate, for example, to the presence of new data of the transportation vehicle, such that the data retrieval is initiated whenever new data of the transportation vehicle are present. In a further exemplary embodiment, the mobile terminal on which the application is installed emulates transportation vehicle-specific components, such as, for example, the transportation vehicle-specific communication unit.

The disclosed system for securely accessing data of a transportation vehicle comprises a mobile terminal and a dedicated memory. An application that is designed to use data of the transportation vehicle is installed on the mobile terminal. Data of the transportation vehicle for retrieval by the mobile terminal are provided in the dedicated memory by way of a controller of the transportation vehicle. According to the disclosed embodiments, the system is designed to execute the method for securely accessing data of a transportation vehicle according to at least one of the embodiments described above. The system may additionally have a central computer. The same benefits and modifications as described above apply.

Further exemplary embodiments result from the other features. The various embodiments cited in this application are able to be combined with one another, unless specifically indicated otherwise.

FIG. 1 shows a system 10 with a transportation vehicle 12 and a mobile terminal 14. An application 16 that is designed to use data of the transportation vehicle 12 is installed on the mobile terminal 14. The transportation vehicle 12 comprises a transportation vehicle-specific media playback system 28 and a transportation vehicle-internal communication system 24.

The transportation vehicle-internal communication system 24 comprises a CAN bus, to which a total of three sensors 26a-26c are connected in terms of signaling, the three sensors 26a-26c recording data of the transportation vehicle 12. The sensor 26a is an acceleration sensor and provides acceleration data of the transportation vehicle 12. The sensor 26b detects the fuel consumption of the transportation vehicle 12 and provides fuel-based consumption data of the transportation vehicle 12. The sensor 26c is a distance sensor and provides data that relate to the distance of the transportation vehicle 12 from a transportation vehicle in front.

The transportation vehicle-specific media playback system 28 has a dedicated memory 18, a controller 20 and an authentication module 22. Data of the transportation vehicle 12 for retrieval by the mobile terminal 14 are provided in the dedicated memory 18 by way of the controller 20 of the transportation vehicle 12. The controller 20 is connected to the transportation vehicle-internal communication system 24 and designed to retrieve the data of the transportation vehicle 12 to be stored in the dedicated memory 18 from the sensors 26a-26c via the transportation vehicle-internal communication system 24. The controller 20 furthermore prevents the application 16 on the mobile terminal 14 from directly accessing the transportation vehicle-internal communication system 24.

The system 10 is designed for the application 16 to be able to authenticate itself on the authentication module 22, designed for this purpose, by way of an identification feature, such that, following successful authentication, read access to the dedicated memory 18 is able to be provided for the application 16 on the mobile terminal 14. The identification feature has been stored beforehand on the mobile terminal 14 and comprises a certificate that is valid for a selected application 16 on a selected mobile terminal 14 to access data of a selected transportation vehicle 12.

The authentication of the application 16 on the authentication module 22, designed for this purpose, by way of the identification feature comprises transmission of the identification feature from the mobile terminal 14 to the transportation vehicle-specific media playback system 28. To provide the data of the transportation vehicle 12, the data of the transportation vehicle 12 are transmitted from the transportation vehicle-internal communication system 24 to the transportation vehicle-specific media playback system 28. The data of the transportation vehicle 12 are then transmitted from the transportation vehicle-specific media playback system 28 to the mobile terminal 14. The authentication of the application 16 and the provision of the data of the transportation vehicle 12 for the application 16 is performed via the communication connection 32. The application 16 on the mobile terminal 14 retrieves the data of the transportation vehicle 12 from the transportation vehicle 12 via an application programming interface.

Figure 2:
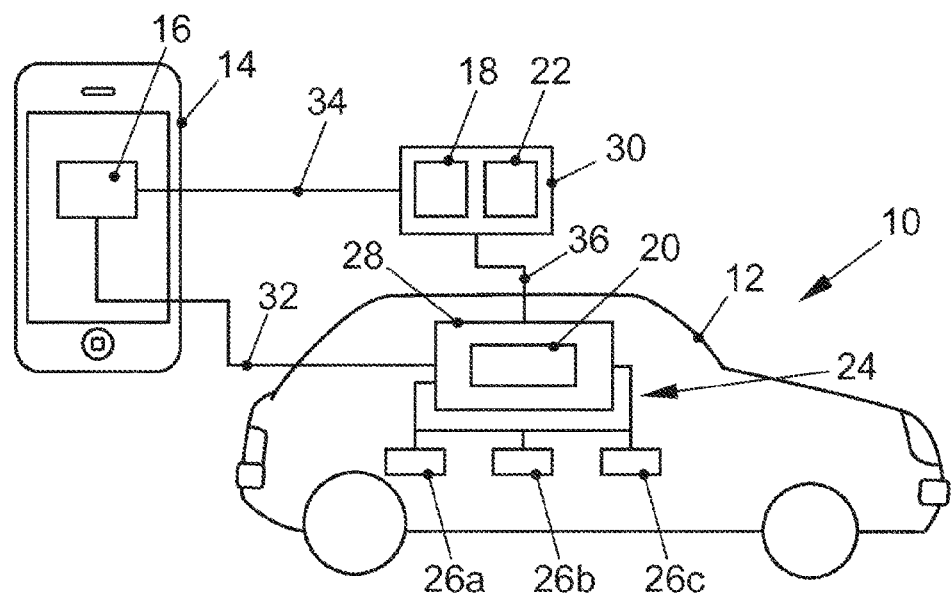
FIG. 2 shows a schematic illustration of a further exemplary embodiment of the disclosed system for securely accessing data of a transportation vehicle.

FIG. 2 shows a system 10 with a transportation vehicle 12, a mobile terminal 14 and a central computer 30. An application 16 that is designed to use data of the transportation vehicle 12 is installed on the mobile terminal 14. The transportation vehicle 12 comprises a transportation vehicle-specific media playback system 28 and a transportation vehicle-internal communication system 24. The central computer 30 is configured as a back-end of a transportation vehicle manufacturer and comprises a dedicated memory 18 and an authentication module 22. The central computer 30 is furthermore designed to communicate with the mobile terminal 14 via the communication connection 34 and with the transportation vehicle 12 via the communication connection 36.

The transportation vehicle-internal communication system comprises an MOST bus, which is connected in terms of signaling to a total of three cameras 26a-26c, the three cameras 26a-26c recording data of the transportation vehicle 12. The camera 26a is a front camera and provides an image signal for the surroundings in front of the transportation vehicle. The camera 26b is a rear camera and provides an image signal for the surroundings behind the transportation vehicle. The camera 26c is an interior camera and provides an image signal for the region of the driver's seat.

The transportation vehicle-specific media playback system 28 has a controller 20. Data of the transportation vehicle 12 are provided in the dedicated memory 18 of the central computer 30 for retrieval by the mobile terminal 14 by way of the controller 20 of the transportation vehicle 12. To this end, the controller 20 is connected to the transportation vehicle-internal communication system 24 and designed to retrieve the data of the transportation vehicle 12 to be stored in the dedicated memory 18 from the cameras 26a-26c via the transportation vehicle-internal communication system 24. The controller 20 furthermore prevents the application 16 on the mobile terminal 14 from directly accessing the transportation vehicle-internal communication system 24.

The system 10 is designed for the application 16 to be able to authenticate itself on the authentication module 22, designed for this purpose, by way of an identification feature, such that, following successful authentication, read access to the dedicated memory 18 is able to be provided for the application 16 on the mobile terminal 14. The identification feature has been stored beforehand on the mobile terminal 14 and comprises a token that is valid for a selected application 16 on a selected mobile terminal 14 to access data of a selected transportation vehicle 12.

The authentication of the application 16 on the authentication module 22, designed for this purpose, by way of an identification feature comprises transmission of the identification feature from the mobile terminal 14 to the transportation vehicle-specific media playback system 28 and transmission of the identification feature from the transportation vehicle-specific media playback system 28 to the central computer 30.

To provide the data of the transportation vehicle 12, the data of the transportation vehicle 12 are transmitted from the transportation vehicle-internal communication system 24 to the transportation vehicle-specific media playback system 28. The data of the transportation vehicle 12 are then transmitted from the transportation vehicle-specific media playback system 28 to the central computer 30. The data of the transportation vehicle 12 are then transmitted from the central computer 30 to the mobile terminal 14. The application 16 is thus authenticated via the communication connections 32 and 36. The provision of the data of the transportation vehicle 12 for the application 16 is thus performed via the communication connections 34 and 36. The application 16 on the mobile terminal 14 retrieves the data of the transportation vehicle 12 from the central computer 30 via an application programming interface.

Due to the fact that the application authenticates itself on an authentication module, designed for this purpose, by way of an identification feature and read access to the dedicated memory is thereupon provided for the application on the mobile terminal, the disclosure allows transportation vehicle-specific data to be provided in a controlled manner for use with applications on mobile terminals.

LIST OF REFERENCE SIGNS

10 system
12 transportation vehicle
14 mobile terminal
16 application
18 dedicated memory
20 controller
22 authentication module
24 transportation vehicle-internal communication system
26a-26c sensors or cameras
28 media playback system
30 central computer
32 communication connection
34 communication connection
36 communication connection

The invention claimed is:
1. A method for securely accessing data of a transportation vehicle, the method comprising:
providing a mobile terminal on which there is installed an application to use data of the transportation vehicle;
providing a dedicated memory, which is part of a central computer and in which, data of the transportation vehicle are provided to the dedicated memory via a controller of the transportation vehicle that is connected to one or more transportation vehicle-internal communication systems for retrieval from the memory by the mobile terminal;
authenticating the application on an authentication module based on an identification feature; and
providing read access to the data provided by the controller in the dedicated memory for the application on the mobile terminal in response to successful authentication, wherein the controller prevents the authenticated application on the mobile terminal from accessing the one or more transportation vehicle-internal communication systems, and wherein the authentication of the application on the authentication module based on the identification feature includes both transmitting the identification feature from the mobile terminal to a transportation vehicle-specific media playback system or a transportation vehicle-specific communication unit, and transmitting the identification feature from the transportation vehicle-specific media playback system or the transportation vehicle-specific communication unit to the central computer.

2. The method of claim 1, wherein the controller is designed to retrieve data of the transportation vehicle to be stored in the dedicated memory via the one or more transportation vehicle-internal communication systems.

3. The method of claim 1, wherein the authentication module is a component of the central computer that communicates with the mobile terminal and the transportation vehicle.

4. The method of claim 1, wherein the identification feature comprises a token and/or a certificate.

5. The method of claim 1, further comprising:

transmitting data of the transportation vehicle from the one or more transportation vehicle-internal communication systems to the transportation vehicle-specific media playback system or the transportation vehicle-specific communication unit;

transmitting data of the transportation vehicle from the transportation vehicle-specific media playback system or the transportation vehicle-specific communication unit to the mobile terminal;

transmitting data of the transportation vehicle from the transportation vehicle-specific media playback system or the transportation vehicle-specific communication unit to the central computer; or transmitting data of the transportation vehicle from the central computer to the mobile terminal.

6. The method of claim 1, wherein the application on the mobile terminal retrieves the data of the transportation vehicle via an application programming interface.

7. A system for securely accessing data of a transportation vehicle, the transportation vehicle having:

a mobile terminal having an application that uses data of the transportation vehicle; and a dedicated memory, which is part of a central computer and in which data of the transportation vehicle are provided via a controller of the transportation vehicle that is connected to one or more transportation vehicle-internal communication systems for retrieval by the mobile terminal;

wherein the system executes a method for securely accessing data of the transportation vehicle by authenticating the application on an authentication module by an identification feature, and providing read access to the data provided by the controller in the dedicated memory for the application on the mobile terminal in response to successful authentication, wherein the controller prevents the authenticated application on the mobile terminal from accessing the one or more transportation vehicle-internal communication systems, and wherein the authentication of the application on the authentication module based on the identification feature includes both transmitting the identification feature from the mobile terminal to a transportation vehicle-specific media playback system or a transportation vehicle-specific communication unit, and transmitting the identification feature from the transportation vehicle-specific media playback system or the transportation vehicle-specific communication unit to the central computer.

8. The system of claim 7, wherein the controller retrieves data of the transportation vehicle to be stored in the dedicated memory via the one or more transportation vehicle-internal communication systems.

9. The system of claim 7, wherein the authentication module is a component of the central computer that communicates with the mobile terminal and the transportation vehicle.

10. The system of claim 7, wherein the identification feature comprises a token and/or a certificate.

11. The system of claim 7, wherein data of the transportation vehicle is transmitted from the one or more transportation vehicle-internal communication systems to the transportation vehicle-specific media playback system or the transportation vehicle-specific communication unit, or data of the transportation vehicle is transmitted from the transportation vehicle-specific media playback system or the transportation vehicle-specific communication unit to the mobile terminal, or data of the transportation vehicle is transmitted from the transportation vehicle-specific media playback system or the transportation vehicle-specific communication unit to the central computer, or data of the transportation vehicle is transmitted from the central computer to the mobile terminal.

12. The system of claim 7, wherein the application on the mobile terminal retrieves the data of the transportation vehicle via an application programming interface.

* * * * *